W. U. SELOVER.
CHECK-REINS FOR HARNESS.
No. 173,188. Patented Feb. 8, 1876.
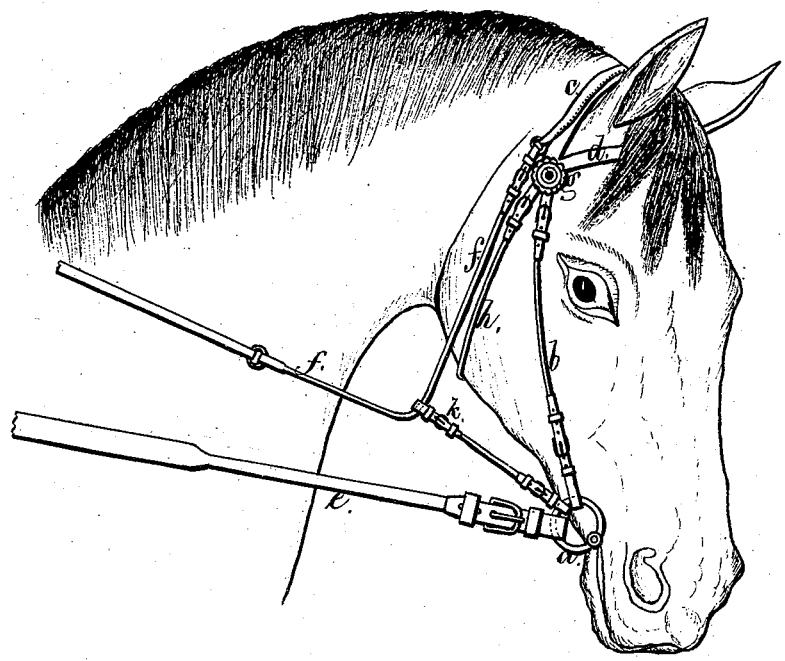
Witnesses,
Chas. H. Smith
Geo. T. Pinckney
Inventor
W. U. Selover.
per Lemuel W. Serrell
atty.

UNITED STATES PATENT OFFICE.

W. UPDYKE SELOVER, OF RAHWAY, NEW JERSEY.

IMPROVEMENT IN CHECK-REINS FOR HARNESS.

Specification forming part of Letters Patent No. 173,188, dated February 8, 1876; application filed June 13, 1874.

*To all whom it may concern:*

Be it known that I, W. UPDYKE SELOVER, of Rahway, in the county of Union and State of New Jersey, have invented an Improvement in Check-Reins for Horses, of which the following is a specification:

Check-reins for horses usually pass from the rings at the ends of the bit through eyes or loops near the upper end of the head-stall, and thence to the check-rein hook on the saddle; but said rein does not tend to draw the horse's nose backward sufficiently to curve the neck gracefully, and prevent the horse's nose protruding unduly, and at the same time the movement of the animal's head is restrained and uncomfortable, because the bit is pulled upward against the fleshy part of the mouth.

My improved check-rein is connected at its ends to the upper part of the head-stall, and passes through bit-loops that are made of adjustable straps connected with the rings of the bit.

The advantages of this construction are, that the nose of the horse is drawn back to whatever extent, and the neck of the animal curved gracefully. The bit is not drawn forcibly against the upper portions of the horse's mouth. The movement of the head is free and easy, and there is no tendency to protrude the animal's nose, as is often the case when the check-rein is drawn too tightly, and the check-rein loops, being variable in length, can be adjusted to direct the pull of the check-rein in any desired manner, and hence hold the head in the proper position.

In the drawing I have represented the said improved check-rein as applied upon a horse's head.

The bit $a$ is of usual character. The side straps $b$, head-strap $c$, front strap $d$, and throat-latch $h$ are of usual character, and the reins $e$ are attached to the rings at the end of the bit. The check-rein $f$ is made adjustable in length in the usual manner; but the ends thereof, instead of being attached to the bit-rings, are connected at or near the rosette $g$ of the head-stall, and at $k$ are loops passing from the bit and around the check-rein, so that said check-rein may slide through these loops. These loops are, by preference, made as straps that are adjustable in length, and hence the place of intersection of the loops $k$ with the rein $f$ may be more or less forward or backward, and at any point the horse's head is free to swing up or down, but it is prevented from moving forward; thereby the animal's head is positioned so as to curve the neck gracefully, and prevent him projecting his nose too far forward.

If desired, the check-rein may be connected to the upper part of the head-stall below the rosette, and between the side straps and throat-latch $h$; or the said check-rein may be buckled at this point to either of these straps, and in such case it is preferable to buckle the ends of the throat-latch beneath the horse's neck.

I am aware that reins have been passed through a loop attached to a bit, and the ends fastened to a strap extending from the head-strap around the throat; but this is not adapted to effect the object I desire, because, when the horse's head moves, the distance between the bit-loop and throat-strap will be varied, causing the end of the loop to rise or descend, and vary the angle of the pull of the check-rein. This is avoided by attaching the ends of the rein to the strap passing across the head, and which, moving with the head, does not lengthen or shorten the distance between the loop and end of the rim; hence the angles made by the loop, reins, and side straps of the head-stall remain unchanged, and also the angle of pull of the check-rein.

I claim as my invention—

The check-rein connected at its ends with the head-strap of the head-stall, in combination with the adjustable loops extending from the bit to the check-rein, as set forth.

Signed by me this 10th day of June, 1874.

W. UPDYKE SELOVER.

Witnesses:
 GEORGE SERRELL,
 GEO. T. PINCKNEY.